(12) United States Patent
Fukatani et al.

(10) Patent No.: US 11,981,835 B2
(45) Date of Patent: May 14, 2024

(54) INTERLAYER FILLER MATERIAL FOR TOUCH PANELS, AND LAMINATE

(71) Applicant: SEKISUI CHEMICAL CO., LTD., Osaka (JP)

(72) Inventors: Juichi Fukatani, Osaka (JP); Ryousuke Ebina, Osaka (JP); Takazumi Okabayashi, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 289 days.

(21) Appl. No.: 17/684,778

(22) Filed: Mar. 2, 2022

(65) Prior Publication Data

US 2022/0186091 A1 Jun. 16, 2022

Related U.S. Application Data

(63) Continuation of application No. 15/568,643, filed as application No. PCT/JP2016/065641 on May 26, 2016, now abandoned.

(30) Foreign Application Priority Data

May 28, 2015 (JP) .................................. 2015-108823

(51) Int. Cl.
*B32B 37/06* (2006.01)
*B32B 17/10* (2006.01)
(Continued)

(52) U.S. Cl.
CPC ....... *C09J 129/14* (2013.01); *B32B 17/10018* (2013.01); *B32B 17/10605* (2013.01);
(Continued)

(58) Field of Classification Search
CPC ... B32B 27/306; B32B 37/06; B32B 38/0036; B32B 38/1883; B32B 2307/202; B32B 2307/412; B32B 2307/42; B32B 2457/208
(Continued)

(56) References Cited

U.S. PATENT DOCUMENTS 11,256,380 B2 * 2/2022 Du ........................... H01B 5/14
2002/0006508 A1 1/2002 Shichiri et al.
(Continued)

FOREIGN PATENT DOCUMENTS

CN 103218081 7/2013
CN 103261351 8/2013
(Continued)

OTHER PUBLICATIONS

International Search Report dated Aug. 9, 2016 in International (PCT) Application No. PCT/JP2016/065641.
(Continued)

*Primary Examiner* — James D Sells
(74) *Attorney, Agent, or Firm* — Wenderoth, Lind & Ponack, L.L.P.

(57) ABSTRACT

An interlayer filling material for a touch panel which is used for filling an interlayer space between a touch panel and another component or an interlayer space between transparent conductive films included in the touch panel in production of a personal digital assistant, which is excellent in followability to steps of a decorative printing portion or wiring upon filling of an interlayer space (lamination) and also excellent in defoaming properties to release air bubbles entrapped during filling of an interlayer space (lamination) or air bubbles left near the steps, which is less likely to be whitened and less likely to deteriorate an ITO film even under a high-temperature and high-humidity environment.
(Continued)

The present invention also aims to provide a laminate produced using the interlayer filling material for a touch panel. The interlayer filling material includes: a polyvinyl acetal; a plasticizer; and an organic acid.

20 Claims, 1 Drawing Sheet (51) Int. Cl.
    *B32B 27/30*     (2006.01)
    *B32B 38/00*     (2006.01)
    *C08J 5/18*     (2006.01)
    *C08K 5/04*     (2006.01)
    *C08K 5/101*     (2006.01)
    *C09J 11/06*     (2006.01)
    *C09J 129/14*     (2006.01)
    *G02B 5/30*     (2006.01)
    *G06F 3/041*     (2006.01)
    *G02B 1/14*     (2015.01)
    *G02F 1/1333*     (2006.01)

(52) U.S. Cl.
    CPC ........ *B32B 17/10761* (2013.01); *B32B 27/30* (2013.01); *B32B 27/306* (2013.01); *B32B 37/06* (2013.01); *B32B 38/0036* (2013.01); *C08J 5/18* (2013.01); *C08K 5/04* (2013.01); *C08K 5/101* (2013.01); *C09J 11/06* (2013.01); *G02B 5/30* (2013.01); *G06F 3/041* (2013.01); *B32B 38/1883* (2013.01); *B32B 2307/202* (2013.01); *B32B 2307/412* (2013.01); *B32B 2307/42* (2013.01); *B32B 2457/208* (2013.01); *C08J 2329/14* (2013.01); *G02B 1/14* (2015.01); *G02B 5/3025* (2013.01); *G02F 1/1333* (2013.01)

(58) Field of Classification Search
    USPC .......................................................... 156/60
    See application file for complete search history.

(56)                       References Cited

U.S. PATENT DOCUMENTS

| | | |
|---|---|---|
| 2002/0150764 A1 | 10/2002 | Shichiri et al. |
| 2012/0132930 A1 | 5/2012 | Young et al. |
| 2013/0280529 A1 | 10/2013 | Toyama et al. |
| 2014/0157693 A1 | 6/2014 | Schumacher |
| 2017/0147098 A1 | 5/2017 | Fukatani |

FOREIGN PATENT DOCUMENTS

| | | |
|---|---|---|
| CN | 103529989 | 1/2014 |
| CN | 103853366 | 6/2014 |
| EP | 1 022 261 | 7/2000 |
| JP | 64-9421 | 1/1989 |
| JP | 2010-215794 | 9/2010 |
| JP | 2011-74308 | 4/2011 |
| JP | 2011-162593 | 8/2011 |
| JP | 2013-166846 | 8/2013 |
| JP | 2014-74122 | 4/2014 |
| JP | 2016-113467 | 6/2016 |
| KR | 2000-0048990 | 7/2000 |
| KR | 10-2014-0101829 | 8/2014 |
| WO | 2015/152334 | 10/2015 |

OTHER PUBLICATIONS

Extended European Search Report dated Dec. 5, 2018 in corresponding European Application No. 16800106.3.

* cited by examiner

INTERLAYER FILLER MATERIAL FOR TOUCH PANELS, AND LAMINATE

TECHNICAL FIELD

The present invention relates to an interlayer filling material for a touch panel which is used for filling an interlayer space between a touch panel and another component or an interlayer space between transparent conductive films included in the touch panel in production of a personal digital assistant, which is excellent in followability to steps of a decorative printing portion or wiring upon filling of an interlayer space (lamination) and also excellent in defoaming properties to release air bubbles entrapped during filling of an interlayer space (lamination) or air bubbles left near the steps, which is less likely to be whitened and less likely to deteriorate an ITO film even under a high-temperature and high-humidity environment. The present invention also relates to a laminate produced using the interlayer filling material for a touch panel.

BACKGROUND ART

Touch panels are used in various fields. In a personal digital assistant such as smartphones or tablet PCs, a touch panel is provided below a surface protection panel made of glass or the like. Below the touch panel, a polarizing film and a display are provided in the stated order.

In such a personal digital assistant, for the purpose of improving the transparency, luminance, and contrast on the display screen to enhance the visibility, an interlayer space between a surface protection panel and a touch panel and an interlayer space between the touch panel and a polarizing film are filled with a filling material that has a smaller difference in refractive index with these components than air does.

As the interlayer filling material for a touch panel, acrylic adhesives or acrylic adhesive tapes are often used from the standpoint of transparency, adhesiveness, and coating properties (see Patent Literature 1, for example).

When an acrylic adhesive or an acrylic adhesive tape is attached as a filling material, however, air bubbles may be entrapped during the attachment to be left between the surface protection panel and the filling material, leading to lower visibility or durability. A printing portion is often formed at the periphery on the rear side of the surface protection panel for masking or the like, and air bubbles tend to be left at the boundary of a step formed by such printing portion or a step of wiring formed in the touch panel, leading to lower visibility or durability. Along with the recent trend of downsizing, thinning, or weight reduction of a personal digital assistant, thinning of a filling material has been desired. Conventional acrylic adhesives or acrylic adhesive tapes hardly achieve both the thin profile and properties of sufficiently following steps to avoid residual air bubbles (followability to steps).

CITATION LIST

Patent Literature

Patent Literature 1: JP 2011-74308 A

SUMMARY OF INVENTION

Technical Problem

The present invention aims to, in consideration of the state of the art, provide an interlayer filling material for a touch panel which is used for filling an interlayer space between a touch panel and another component or an interlayer space between transparent conductive films included in the touch panel in production of a personal digital assistant, which is excellent in followability to steps of a decorative printing portion or wiring upon filling of an interlayer space (lamination) and also excellent in defoaming properties to release air bubbles entrapped during filling of an interlayer space (lamination) or air bubbles left near the steps, which is less likely to be whitened and less likely to deteriorate an ITO film even under a high-temperature and high-humidity environment. The present invention also aims to provide a laminate produced using the interlayer filling material for a touch panel.

Solution to Problem

The present invention relates to an interlayer filling material for a touch panel used for filling an interlayer space between a touch panel and another component or an interlayer space between transparent conductive films included in the touch panel, the interlayer filling material including: a polyvinyl acetal; a plasticizer; and an organic acid, the plasticizer being at least one selected from the group consisting of triethylene glycol-di-2-ethylhexanoate, tetraethylene glycol-di-2-ethylhexanoate, triethylene glycol-di-pivalate, and di-(2-butoxyethyl)adipate, the organic acid being at least one selected from the group consisting of 2-ethylhexanoic acid, adipic acid, and phthalic acid.

The present invention will be specifically described in the following.

The present inventors have studied an interlayer filling material for a touch panel used for filling an interlayer space between a touch panel and another component, and considered the use of a sheet-like interlayer filling material for a touch panel containing a plasticized polyvinyl acetal as an alternative to conventionally widely used acrylic adhesives. Being less tacky at normal temperature, the plasticized polyvinyl acetal is less likely to cause adhesive deposit on a punching blade in a punching process at normal temperature. By contrast, the plasticized polyvinyl acetal can sufficiently follow steps of a decorative printing portion or wiring when pressure-bonded under heating. Additionally, when the personal digital assistant is broken on impact of a fall or the like, prevention of scattering of glass fragments or the like can be expected.

However, when a touch panel produced using an interlayer filling material for a touch panel containing a plasticized polyvinyl acetal is exposed to a high-temperature and high-humidity environment (e.g., temperature of 85° C. and humidity of 85%), the interlayer filling material for a touch panel is whitened to have lower transparency, and the lowered transparency is not recovered even when the temperature is lowered to a normal temperature. This is presumably because moisture intruding from a side end of the laminated face is absorbed by the interlayer filling material for a touch panel and condensed when the temperature is lowered to a normal temperature.

As a result of intensive studies, the present inventors found out that the interlayer filling material for a touch panel blended with an organic acid can prevent whitening thereof even under a high-temperature and high-humidity environment. However, when the interlayer filling material for a touch panel blended with an organic acid is used, the organic acid problematically deteriorates an ITO film of a touch panel.

To overcome the situation, the present inventors made further intensive studies to find out that an interlayer filling material for a touch panel prepared by combining a specific organic acid, namely, at least one organic acid selected from the group consisting of 2-ethylhexanoic acid, adipic acid, and phthalic acid, with a specific plasticizer, namely, at least one plasticizer selected from the group consisting of triethylene glycol-di-2-ethylhexanoate (3GO), tetraethylene glycol-di-2-ethylhexanoate (4GO), triethylene glycol-di-pivalate (3GT), and di-(2-butoxyethyl)adipate (DBEA), is not likely to be whitened even under a high-temperature and high-humidity environment or deteriorate an ITO film. The present invention was thus completed.

The interlayer filling material for a touch panel of the present invention contains a polyvinyl acetal, a plasticizer, and an organic acid. A polyvinyl acetal plasticized with a plasticizer has a higher storage modulus and a higher loss modulus at normal temperature (around 20° C.) than an acrylic adhesive so as to be less likely to cause adhesive deposit on a punching blade during a punching process at normal temperature. By contrast, since the storage modulus and the loss modulus of the plasticized polyvinyl acetal are significantly lowered by heating (around 70° C.), the plasticized polyvinyl acetal pressure-bonded under heating can sufficiently follow steps of a decorative printing portion or wiring to release air bubbles left at the boundaries of the steps.

The polyvinyl acetal can be prepared by saponifying polyvinyl acetate to prepare polyvinyl alcohol and then acetalizing the polyvinyl alcohol with an aldehyde in the presence of a catalyst. The degree of saponification of the polyvinyl alcohol is not particularly limited, and is commonly within a range of 70 to 99.9 mol %. The degree of saponification of the polyvinyl alcohol is preferably 70 to 99.8 mol %, more preferably 80 to 99.8 mol %.

The average degree of polymerization of the polyvinyl alcohol is not particularly limited. From the standpoint of sufficiently suppressing scattering of fragments of glass or the like (scattering prevention) when the personal digital assistant is broken upon impact of a fall or the like, a polyvinyl acetal with a large molecular weight is preferred, and therefore, the polyvinyl alcohol used preferably has a high average degree of polymerization. The lower limit of the average degree of polymerization of the polyvinyl alcohol is preferably 200, and the upper limit thereof is preferably 4,000. When the average degree of polymerization is less than 200, the mechanical strength of the plasticized polyvinyl acetal may be lowered, failing to sufficiently suppress scattering of fragments when the personal digital assistant is broken. When the average degree of polymerization is more than 4,000, the viscosity of the solution during acetalization of the polyvinyl alcohol becomes excessively high to make the acetalization difficult. Moreover, molding of the interlayer filling material for a touch panel may be difficult. The lower limit of the average degree of polymerization is more preferably 600, and the upper limit thereof is more preferably 3,800. The lower limit is still more preferably 800, and the upper limit is still more preferably 3,600.

For acetalization of the polyvinyl alcohol with an aldehyde in the presence of a catalyst, a solution containing the polyvinyl alcohol may be used. An exemplary solvent used for the solution containing the polyvinyl alcohol is water.

The aldehyde is not particularly limited. Commonly, a C1-C10 aldehyde is favorably used.

The C1-C10 aldehyde is not particularly limited, and may be either a linear aldehyde or a branched aldehyde. Examples thereof include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Among these, preferred are n-butyraldehyde, n-hexylaldehyde, and n-valeraldehyde, and more preferred is n-butyraldehyde. These aldehydes may be used alone, or in combination of two or more thereof.

In other words, the polyvinyl acetal is preferably polyvinyl butyral (when the aldehyde is n-butyraldehyde, the polyvinyl acetal is referred to as polyvinyl butyral). The use of the polyvinyl butyral allows the interlayer filling material for a touch panel to exhibit appropriate adhesiveness to glass, leading to better light resistance or weather resistance. Two or more types of polyvinyl acetals may be optionally used.

For excellent followability and defoaming properties, the polyvinyl acetal preferably has fewer intermolecular crosslinks. In the case of having fewer intermolecular crosslinks, the polyvinyl acetal can provide an interlayer filling material for a touch panel having better followability to steps even if the molecular weight, acetyl group content, and degree of acetalization thereof are not changed. In addition, when the polyvinyl acetal has a larger molecular weight, scattering prevention properties is further excellent.

Such a polyvinyl acetal having fewer intermolecular crosslinks is preferably obtained by, for example, avoiding addition of an excessive amount of the aldehyde before or during the acetalization with the aldehyde so as not to allow crosslinking of main chains of adjacent molecules of the polyvinyl alcohol. When the added amount of the aldehyde exceeds the amount needed for acetalization, the degree of crosslinking becomes high.

The lower limit of the amount of hydroxy groups (hydroxy group content) is preferably 16 mol %, and the upper limit thereof is preferably 45 mol %. When the hydroxy group content is 16 mol % or more, the adhesiveness of the interlayer filling material for a touch panel to glass is improved. When the hydroxy group content is 45 mol % or less, the polyvinyl acetal has higher flexibility to be easily handleable. Moreover, the compatibility between the polyvinyl acetal and the plasticizer is enhanced to improve the followability of the interlayer filling material for a touch panel to steps. The lower limit of the hydroxy group content is more preferably 18 mol %, still more preferably 20 mol %, particularly preferably 22 mol %. The upper limit thereof is more preferably 40 mol %, still more preferably 38 mol %, further preferably 36 mol %, particularly preferably 35 mol %.

The hydroxy group content of the polyvinyl acetal is a value in percentage of the mole fraction (mol %) obtained by dividing the amount of ethylene groups to which hydroxy groups are bonded by the total amount of ethylene groups of the main chain. The amount of ethylene groups to which hydroxy groups are bonded can be determined, for example, by the method in conformity with JIS K6728 "Testing methods for polyvinyl butyral".

The lower limit of the degree of acetylation (acetyl group content) of the polyvinyl acetal is preferably 0.1 mol %, and the upper limit thereof is preferably 30 mol %. When the acetyl group content is 0.1 mol % or more, the compatibility between the polyvinyl acetal and the plasticizer is enhanced to improve the followability of the interlayer filling material for a touch panel to steps. When the acetyl group content is 30 mol % or less, the moisture resistance of the polyvinyl acetal is improved. When the acetyl group content is more than 30 mol %, the reaction efficiency during the production of the polyvinyl acetal may be lowered. The lower limit of the acetyl group content is more preferably 0.2 mol %, still more preferably 0.3 mol %. The upper limit thereof is more preferably 24 mol %, still more preferably 20 mol %, further preferably 19.5 mol %, particularly preferably 15 mol %.

The acetyl group content of the polyvinyl acetal is a value in percentage of the mole fraction (mol %) obtained by subtracting the amount of ethylene groups to which acetal groups are bonded and the amount of ethylene groups to which hydroxy groups are bonded from the total amount of ethylene groups of the main chain and then dividing the obtained value by the total amount of ethylene groups of the main chain. The amount of ethylene groups to which acetal groups are bonded can be determined, for example, in conformity with JIS K6728 "Testing methods for polyvinyl butyral".

The acetyl group content of the polyvinyl acetal is controlled within the above range, for example, by adjusting the degree of saponification of the polyvinyl alcohol. In other words, the acetyl group content of the polyvinyl acetal depends on the degree of saponification of the polyvinyl alcohol. In the case where the polyvinyl alcohol used has a lower degree of saponification, the acetyl group content of the polyvinyl acetal becomes larger. By contrast, in the case where the polyvinyl alcohol used has a higher degree of saponification, the acetyl group content of the polyvinyl acetal becomes smaller.

The lower limit of the degree of acetalization of the polyvinyl acetal is preferably 50 mol %, and the upper limit thereof is preferably 85 mol %. When the degree of acetalization is 50 mol % or higher, the compatibility between the polyvinyl acetal and the plasticizer is enhanced. When the degree of acetalization is 85 mol % or lower, the reaction time needed for the production of the polyvinyl acetal can be shortened. The lower limit of the degree of acetalization is more preferably 54 mol %, still more preferably 58 mol %, particularly preferably 60 mol %. The upper limit of the degree of acetalization is more preferably 82 mol %, still more preferably 79 mol %, particularly preferably 77 mol %.

The degree of acetalization of the polyvinyl acetal is a value in percentage of the mole fraction (mol %) obtained by dividing the amount of ethylene groups to which acetal groups are bonded by the total amount of ethylene groups of the main chain. The degree of acetalization can be determined by measuring the acetyl group content and the vinyl alcohol content (amount of hydroxy groups) by the method in conformity with JIS K6728 "Testing methods for polyvinyl butyral", calculating the mole fraction based on the measurement results, and subtracting the acetyl group content and the vinyl alcohol content from 100 mol %.

The degree of acetalization of the polyvinyl acetal can be controlled, for example, by adjusting the amount of the aldehyde. When the amount of the aldehyde is smaller, the degree of acetalization of the polyvinyl acetal is lowered. When the amount of the aldehyde is larger, the degree of acetalization of the polyvinyl acetal is increased.

The plasticizer is at least one selected from the group consisting of triethylene glycol-di-2-ethylhexanoate (3GO), tetraethylene glycol-di-2-ethylhexanoate (4GO), triethylene glycol-di-pivalate (3GT), and di-(2-butoxyethyl) adipate (DBEA). The use of the specific plasticizer and specific organic acid in combination provides an interlayer filling material for a touch panel which is less likely to be whitened and less likely to deteriorate an ITO film under a high-temperature and high-humidity environment. In particular, for excellent followability of the interlayer filling material for a touch panel to steps, preferred is triethylene glycol-di-2-ethylhexanoate (3GO).

The amount of the plasticizer in the interlayer filling material for a touch panel of the present invention is not particularly limited. The lower limit thereof is preferably 5 parts by weight and the upper limit thereof is preferably 75 parts by weight, relative to 100 parts by weight of the polyvinyl acetal. When the amount is within the above range, the interlayer filling material for a touch panel can exhibit higher followability to steps upon filling of an interlayer space (lamination), and whitening and deterioration of an ITO film under a high-temperature and high-humidity environment can be more effectively prevented. When the amount of the plasticizer is less than 5 parts by weight, moldability of the interlayer filling material for a touch panel may be lowered. When the amount is more than 75 parts by weight, the transparency of the interlayer filling material for a touch panel may be lowered or the plasticizer may bleed. The lower limit of the amount of the plasticizer is more preferably 10 parts by weight, and the upper limit is more preferably 65 parts by weight. The lower limit is still more preferably 15 parts by weight and the upper limit is still more preferably 55 parts by weight. The lower limit is particularly preferably 20 parts by weight and the upper limit is particularly preferably 45 parts by weight.

In the interlayer filling material for a touch panel of the present invention, the total amount of the polyvinyl acetal and the plasticizer is preferably 50% by weight or more. When the total amount of the polyvinyl acetal and the plasticizer is less than 50% by weight, scattering of fragments upon breakage of the personal digital assistant may not be sufficiently suppressed, or air bubbles may be left at steps upon filling of an interlayer space (lamination). The lower limit of the total amount of the polyvinyl acetal and the plasticizer is more preferably 60% by weight, still more preferably 70% by weight, particularly preferably 80% by weight, most preferably 90% by weight.

The organic acid is at least one selected from the group consisting of 2-ethylhexanoic acid, adipic acid, and phthalic acid. The use of the specific organic acid and the specific plasticizer in combination can provide an interlayer filling material for a touch panel which is less likely to be whitened and less likely to deteriorate an ITO film under a high-temperature and high-humidity environment.

The amount of the organic acid in the interlayer filling material for a touch panel of the present invention is not particularly limited. The lower limit thereof is preferably 0.01 parts by weight and the upper limit thereof is preferably 5 parts by weight, relative to 100 parts by weight of the polyvinyl acetal. When the amount of the organic acid is within the above range, whitening and deterioration of an ITO film under a high-temperature and high-humidity environment can be more effectively prevented. When the amount of the organic acid is less than 0.01 parts by weight, the effect of preventing whitening under a high-temperature and high-humidity environment may be insufficient. When the amount of the organic acid is more than 5 parts by weight, an ITO film contacting the filling material may be deteriorated when exposed to a high-temperature and high-humidity environment. The lower limit of the amount of the organic acid is more preferably 0.02 parts by weight, and the upper limit thereof is more preferably 3 parts by weight. The lower limit is still more preferably 0.03 parts by weight, and the upper limit is still more preferably 1 part by weight.

The interlayer filling material for a touch panel of the present invention may optionally contain known additives such as an adhesion modifier, a tackifier resin, a plasticizer, an emulsifier, a softener, fine particles, a filler, a pigment, a dye, a silane coupling agent, an antioxidant, a surfactant, and a wax, within a range that the transparency is not lowered and the effect of the present invention is not impaired.

The form of the interlayer filling material for a touch panel of the present invention is not particularly limited, and may be a sheet, film, or liquid (dispersion, emulsion) form. Preferred is a sheet form. The interlayer filling material for a touch panel of the present invention can sufficiently follow steps of a decorative printing portion or wiring even in the form of a thin filling material to remove air bubbles left at the boundaries of the steps.

The thickness of the interlayer filling material for a touch panel of the present invention in the sheet form is not particularly limited, and determined in accordance with the application. The lower limit is preferably 5 μm, and the upper limit is preferably 800 μm. When the thickness is less than 5 μm, air bubbles may tend to be left at steps upon filling of an interlayer space (lamination). The lower limit of the thickness is more preferably 10 μm, and the upper limit is more preferably 400 μm. The lower limit is still more preferably 50 μm, and the upper limit is still more preferably 300 μm. The lower limit is particularly preferably 100 μm, and the upper limit is particularly preferably 200 μm.

The interlayer filling material for a touch panel of the present invention may be produced by any method. In the case of the interlayer filling material for a touch panel in the sheet form, for example, a composition containing the polyvinyl acetal, the plasticizer, the organic acid, and optionally added additives is formed into a sheet by a conventional sheet-forming method such as extrusion, application, casting, calendering, or pressing.

The application of the interlayer filling material for a touch panel of the present invention is not particularly limited. The interlayer filling material for a touch panel of the present invention is preferably used for at least one interlayer space selected from the group consisting of an interlayer space between a surface protection panel and a touch panel, an interlayer space between the touch panel and a polarizing film, and an interlayer space between transparent conductive films included in the touch panel in a personal digital assistant (e.g., smartphones, tablet PCs) or a flat-type or flexible-type image display device (e.g., electronic paper, PDAs, TVs, game machines) including an image display panel such as LCD, EL, or PDP.

Figure 1:
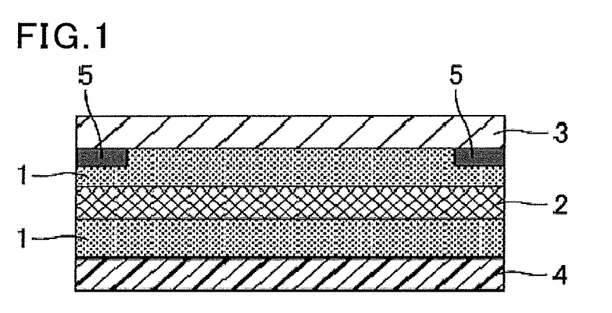
FIG. 1 is a cross-sectional view schematically illustrating an exemplary application of the interlayer filling material for a touch panel of the present invention.

FIG. 1 is a cross-sectional view schematically illustrating an exemplary application of the interlayer filling material for a touch panel of the present invention. In FIG. 1, the interlayer space between a surface protection panel 3 and a touch panel 2 and the interlayer space between the touch panel 2 and a polarizing film 4 are filled with the interlayer filling material for a touch panel 1 of the present invention.

In FIG. 1, decorative printing portions 5 are formed at the periphery on the rear side of the surface protection panel 3 for the purpose of masking or the like, and the interlayer filling material for a touch panel 1 of the present invention sufficiently follows steps formed by such decorative printing portions 5 and steps (not illustrated) of the wiring formed in the touch panel 2 so as to remove air bubbles left at the boundaries of the steps upon filling of the interlayer space (lamination).

The present invention also encompasses a laminate including: a touch panel; and the interlayer filling material for a touch panel of the present invention, the interlayer filling material for a touch panel filling at least one interlayer space selected from the group consisting of an interlayer space between a surface protection panel and the touch panel, an interlayer space between the touch panel and a polarizing film, and an interlayer space between transparent conductive films included in the touch panel.

The surface protection panel is not particularly limited, and may be one commonly used for personal digital assistants, flat-type or flexible-type image display devices, or the like, such as a glass sheet, a polycarbonate sheet, or an acrylic sheet.

The touch panel is not particularly limited, and may be one commonly used for personal digital assistants, flat-type or flexible-type image display devices, or the like, such as a touch panel including a plurality of layers (e.g., ITO film). The configuration of the touch panel is not particularly limited, and examples thereof include the out-cell type, in-cell type, on-cell type, cover glass-integrated type, and cover sheet-integrated type. The system of the touch panel is also not particularly limited, and examples thereof include the resistive film type, capacitive type, optical type, and ultrasonic type.

The polarizing film is also not particularly limited, and may be one commonly used for personal digital assistants, flat-type or flexible-type image display devices, or the like.

The method for producing a laminate by filling at least one interlayer space selected from the group consisting of an interlayer space between a surface protection panel and the touch panel, an interlayer space between the touch panel and a polarizing film, and an interlayer space between transparent conductive films included in the touch panels, with the interlayer filling material for a touch panel of the present invention is not particularly limited. For example, the interlayer space between the surface protection panel and the touch panel, the interlayer space between the touch panel and the polarizing film, and the interlayer space between the transparent conductive films included in the touch panel are filled with the interlayer filling material for a touch panel of the present invention, and the resulting stack is preliminarily heat-bonded at around 70° C. The preliminary heat-bonding may be performed using a vacuum laminator under the conditions of, for example, 1 atm, 70° C., and 30 minutes. After the preliminary heat-bonding, an autoclave treatment (for example, at 85° C. and 0.5 MPa or more for 30 minutes) is performed to provide a laminate.

Advantageous Effects of Invention

The present invention can provide an interlayer filling material for a touch panel which is used for filling an interlayer space between a touch panel and another component or an interlayer space between transparent conductive films included in the touch panel in production of a personal digital assistant, which is excellent in followability to steps of a decorative printing portion or wiring upon filling of an interlayer space (lamination) and also excellent in defoaming properties to release air bubbles entrapped during filling of an interlayer space (lamination) or air bubbles left near the steps, which is less likely to be whitened and less likely to deteriorate an ITO film even under a high-temperature and high-humidity environment. The present invention can also provide a laminate produced using the interlayer filling material for a touch panel.

DESCRIPTION OF EMBODIMENTS

Embodiments of the present invention will be specifically described in the following with reference to, but not limited to, the examples.

Examples 1 to 24, Comparative Examples 1 to 30

(1) Preparation of Polyvinyl Butyral

A reactor equipped with a stirrer was charged with 2,700 mL of ion exchange water and 300 g of polyvinyl alcohol having an average degree of polymerization of 3,200 and a degree of saponification of 88.0 mol %, and the contents were heated with stirring to be dissolved, thereby preparing a solution. To the obtained solution was added as a catalyst 35% by weight hydrochloric acid such that the hydrochloric acid concentration was set to 0.6% by weight. The temperature of the mixture was adjusted to 15° C., and 14.2 g of n-butyraldehyde (n-BA) was added thereto with stirring. Then, 186 g of n-butyraldehyde (n-BA) was further added, so that polyvinyl butyral in the form of white particles was precipitated. Fifteen minutes after the precipitation, 35% by weight hydrochloric acid was added such that the hydrochloric acid concentration was set to 3.9% by weight. The mixture was heated to 45° C. and aged at 45° C. for three hours. After cooling and neutralization of the solution, the polyvinyl butyral was washed with water and then dried, thereby preparing polyvinyl butyral. The obtained polyvinyl butyral had a hydroxy group content of 24.0 mol %, an acetyl group content of 12.0 mol %, and a degree of butyralization (Bu degree) of 64.0 mol %.

(2) Production of Interlayer Filling Material for a Touch Panel

To 100 parts by weight of the obtained polyvinyl butyral were added a plasticizer and an organic acid each of the type and in an amount as specified in Table 1 or 2, and sufficiently mixed to give a mixture. The obtained mixture was press-molded using a press-molding machine into a sheet, thereby preparing an interlayer filling material for a touch panel with a thickness of 200 μm.

In the tables, "3G1" refers to triethylene glycol-di-acetate and "3GE" refers to triethylene glycol-di-propanoate.

<Evaluation>

The interlayer filling materials for a touch panel obtained in the examples and comparative examples were evaluated by the following methods.

Tables 1 and 2 show the results.

(1) Evaluation of Defoaming Properties

To a white glass sheet (76 mm×52 mm, thickness of 1.0 to 1.2 mm, S9112 available from Matsunami Glass Ind., Ltd.) was attached the interlayer filling material for a touch panel cut to the same size as the white glass sheet. To the other face of the interlayer filling material for a touch panel was attached an ITO-PET film (ITO-coated polyethylene terephthalate (PET) film) cut to the same size as the white glass sheet, thereby preparing a glass/interlayer filling material for a touch panel/ITO-PET film structure. At this time, air bubbles were intendedly included at the interface between the glass sheet and the interlayer filling material for a touch panel.

The structure was preliminarily heat-bonded in a vacuum laminator at 70° C. and 1 atm for 30 minutes, heated in an autoclave at 70° C. and 0.5 MPa for 30 minutes, and decompressed after cooling to 30° C. or lower. A laminate in which the interlayer space between the glass sheet and the ITO-PET film was filled with the interlayer filling material for a touch panel was thus prepared.

The obtained laminate was observed with a digital microscope (Keyence Corporation). The case where no residual air bubbles were observed was rated "0 (Good)". The case where residual air bubbles were observed was rated "x (Poor)".

(2) Evaluation of Followability to Steps

To a white glass sheet (76 mm×52 mm, thickness of 1.0 to 1.2 mm, 59112 available from Matsunami Glass Ind., Ltd.) was attached a frame-shaped one-sided adhesive (thickness of 100 μm) in the hollow square shape (outer frame: 76 mm×52 mm, inner frame: 56 mm×32 mm), thereby forming a step.

To the surface of the white glass sheet where the frame-shaped step in the hollow square shape was formed was applied the interlayer filling material for a touch panel cut to a size of 76 mm×52 mm. To the interlayer filling material for a touch panel was further attached an ITO-coated polyethylene terephthalate film (ITO-PET available from Sekisui Nano Coat Technology) cut to a size of 76 mm×52 mm. Upon each lamination, entrapment of air bubbles was avoided as far as possible.

The structure was preliminarily heat-bonded using a vacuum laminator at 70° C. and 1 atm for 30 minutes, heated in an autoclave at 70° C. and 0.5 MPa for 30 minutes, and decompressed after cooling to 30° C. or lower. A laminate in which the interlayer space between the glass sheet and the ITO-PET film was filled with the interlayer filling material for a touch panel was thus prepared.

The obtained laminate was observed with a digital microscope (available from Keyence Corporation). The case where no air bubbles were observed at the step was rated "o (Good)". The case where air bubbles were observed at the step was rated "x (Poor)".

Figure 2:
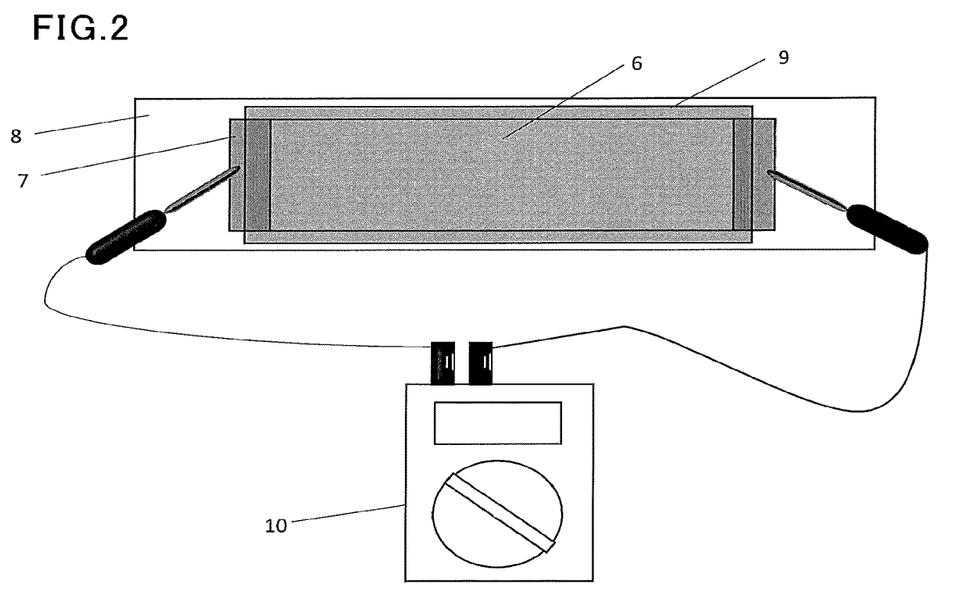
FIG. 2 is a schematic view for explaining a method of testing the interlayer filling material for a touch panel obtained in each of the examples and comparative examples to evaluate the properties of suppressing deterioration of an ITO film (ITO deterioration properties) under a high-temperature and high-humidity environment.

(3) Evaluation of Properties of not Deteriorating ITO Film Under High-Temperature and High-Humidity Environment FIG. 2 shows a schematic view for explaining a method of testing the interlayer filling material for a touch panel to evaluate the properties of suppressing deterioration of an ITO film (ITO deterioration properties) under a high-temperature and high-humidity environment.

As illustrated in FIG. 2, to a conductive film 6 (25 mm in width, 120 mm in length) with an ITO film formed on its surface was applied silver paste at both ends in the lengthwise direction each in a width of 15 mm. The applied silver paste was heated to be dried, thereby forming silver layers (silver electrodes) 7. The conductive film 6 with the silver layers 7 formed thereon was attached to a glass sheet 8. Then, an interlayer filling material for a touch panel (width of 30 mm, length of 100 mm) 9 was attached to contact the both silver layers 7, the obtained product was treated in an autoclave at 70° C. and 0.5 MPa for 30 minutes, thereby preparing an evaluation sample.

The evaluation sample includes, as illustrated in FIG. 2, the conductive film 6, the silver layers 7, the glass sheet 8, and the interlayer filling material for a touch panel 9.

The resistance value between the silver layers 7 of the evaluation sample was measured with a tester 10, and the obtained value was defined as the "ITO resistance value (initial)". Then, the evaluation sample was left in an environment at a temperature of 85° C. and a humidity of 85% for a high-temperature and high-humidity treatment for 250 hours. After the treatment, the resistance value between the silver layers 7 of the evaluation sample was measured with the tester 10, and the obtained value was defined as the "ITO resistance value (after high-temperature and high-humidity treatment)".

The value of "ITO resistance value (after high-temperature and high-humidity treatment)/"ITO resistance value (initial)" was calculated. The case where the calculated value was 10 or less was rated "o (Good)". The case where the calculated value was more than 10 and 15 or less was rated "Δ (Average)". The case where the calculated value was more than 15 was rated "x (Poor)".

(4) Evaluation of Whitening Resistance Under a High-Temperature and High-Humidity Environment To a white glass sheet (76 mm×52 mm, thickness of 1.0 to 1.2 mm, 59112 available from Matsunami Glass Ind., Ltd.) was attached the interlayer filling material for a touch panel cut to the same size as the white glass sheet. To the other surface of the interlayer filling material for a touch panel was attached an ITO-PET film (ITO-coated polyethylene terephthalate (PET) film) cut to the same size as the white glass sheet, thereby preparing a glass/interlayer filling material for a touch panel/ITO-PET film structure. Upon each lamination, entrapment of air bubbles was avoided as far as possible.

The structure was preliminarily heat-bonded using a vacuum laminator at 70° C. and 1 atm for 30 minutes, heated in an autoclave at 70° C. and 0.5 MPa for 30 minutes, and decompressed after cooling to 30° C. or lower. A laminate in which the interlayer space between the glass sheet and the ITO-PET film was filled with the interlayer filling material for a touch panel was thus prepared.

The obtained laminate was left in an environment at a temperature of 85° C. and a humidity of 85% for a high-temperature and high-humidity treatment for 250 hours. The laminate was taken out after the treatment and allowed to stand still for 30 minutes. Then, the haze value thereof was measured with a haze meter (Haze meter TC-HIIIDPK available from Tokyo Denshoku Co., Ltd.). The case where the haze value was 1.0% or less was rated "0 (Good)". The case where the haze value was more than 1.0% was rated "x (Poor)".

TABLE 1

| | Interlayer filling material for a touch panel | | | | | Evaluation | | | |
|---|---|---|---|---|---|---|---|---|---|
| | | Plasticizer | | Organic acid | | Properties | | | |
| | Resin | Type | Parts by weight (phr) | Type | Parts by weight (phr) | Defoaming properties | Follow-ability to steps | of not deteriorating ITO film | Whitening resistance |
| Example 1 | Polyvinyl butyral | 3GO | 30 | 2-Ethylhexanoic acid | 0.01 | o | o | o | o |
| Example 2 | Polyvinyl butyral | 3GO | 30 | 2-Ethylhexanoic acid | 0.05 | o | o | o | o |
| Example 3 | Polyvinyl butyral | 3GO | 30 | 2-Ethylhexanoic acid | 0.1 | o | o | o | o |
| Example 4 | Polyvinyl butyral | 3GO | 30 | 2-Ethylhexanoic acid | 1 | o | o | o | o |
| Example 5 | Polyvinyl butyral | 3GO | 30 | Adipic acid | 0.01 | o | o | o | o |
| Example 6 | Polyvinyl butyral | 3GO | 30 | Adipic acid | 0.05 | o | o | o | o |
| Example 7 | Polyvinyl butyral | 3GO | 30 | Adipic acid | 0.1 | o | o | o | o |
| Example 8 | Polyvinyl butyral | 3GO | 30 | Adipic aoid | 1 | o | o | o | o |
| Example 9 | Polyvinyl butyral | 3GO | 30 | Phthalic acid | 0.01 | o | o | o | o |
| Example 10 | Polyvinyl butyral | 3GO | 30 | Phthalic acid | 0.05 | o | o | o | o |
| Example 11 | Polyvinyl butyral | 3GO | 30 | Phthalic acid | 0.1 | o | o | o | o |
| Example 12 | Polyvinyl butyral | 3GO | 30 | Phthalic acid | 1 | o | o | o | o |
| Example 13 | Polyvinyl butyral | 3GO | 30 | 2-Ethylhexanoic acid | 3 | o | o | Δ | o |
| Example 14 | Polyvinyl butyral | 3GO | 30 | Adipic acid | 3 | o | o | Δ | o |
| Example 15 | Polyvinyl butyral | 3GO | 30 | Phthalic acid | 3 | o | o | Δ | o |
| Example 16 | Polyvinyl butyral | 4GO | 30 | 2-Ethylhexanoic acid | 0.05 | o | o | o | o |
| Example 17 | Polyvinyl butyral | 4GO | 30 | Adipic acid | 0.05 | o | o | o | o |
| Example 18 | Polyvinyl butyral | 4GO | 30 | Phthalic acid | 0.05 | o | o | o | o |
| Example 19 | Polyvinyl butyral | 3GT | 30 | 2-Ethylhexanoic acid | 0.05 | o | o | o | o |
| Example 20 | Polyvinyl butyral | 3GT | 30 | Adipic acid | 0.05 | o | o | o | o |
| Example 21 | Polyvinyl butyral | 3GT | 30 | Phthalic acid | 0.05 | o | o | o | o |
| Example 22 | Polyvinyl butyral | DBEA | 30 | 2-Ethylhexanoic acid | 0.05 | o | o | o | o |
| Example 23 | Polyvinyl butyral | DBEA | 30 | Adipic acid | 0.05 | o | o | o | o |
| Example 24 | Polyvinyl butyral | DBEA | 30 | Phthalic acid | 0.05 | o | o | o | o |

TABLE 2

| | Interlayer filling material for a touch panel | | | | | Evaluation | | | |
|---|---|---|---|---|---|---|---|---|---|
| | | Plasticizer | | Organic acid | | | | Properties | |
| | Resin | Type | Parts by weight (phr) | Type | Parts by weight (phr) | Defoaming properties | Follow-ability to steps | of not deteriorating ITO film | Whitening resistance |
| Comparative Example 1 | Polyvinyl butyral | 3GO | 30 | Hydrochloric acid | 0.01 | o | o | x | x |
| Comparative Example 2 | Polyvinyl butyral | 3GO | 30 | Hydrochloric acid | 0.05 | o | o | x | x |

TABLE 2-continued

| | Interlayer filling material for a touch panel | | | | | | | | |
|---|---|---|---|---|---|---|---|---|---|
| | | Plasticizer | | Organic acid | | Evaluation | | | |
| | Resin | Type | Parts by weight (phr) | Type | Parts by weight (phr) | Defoaming properties | Follow-ability to steps | Properties of not deteriorating ITO film | Whitening resistance |
| Comparative Example 3 | Polyvinyl butyral | 3GO | 30 | Hydrochloric acid | 0.1 | ○ | ○ | x | x |
| Comparative Example 4 | Polyvinyl butyral | 3GO | 30 | Hydrochloric acid | 1 | ○ | ○ | x | x |
| Comparative Example 5 | Polyvinyl butyral | 3GO | 30 | Phosphoric acid | 0.01 | ○ | ○ | x | ○ |
| Comparative Example 6 | Polyvinyl butyral | 3GO | 30 | Phosphoric acid | 0.05 | ○ | ○ | x | ○ |
| Comparative Example 7 | Polyvinyl butyral | 3GO | 30 | Phosphoric acid | 0.1 | ○ | ○ | x | ○ |
| Comparative Example 8 | Polyvinyl butyral | 3GO | 30 | Phosphoric acid | 1 | ○ | ○ | x | ○ |
| Comparative Example 9 | Polyvinyl butyral | 3GO | 30 | Acetic acid | 0.01 | ○ | ○ | x | ○ |
| Comparative Example 10 | Polyvinyl butyral | 3GO | 30 | Acetic acid | 0.05 | ○ | ○ | x | ○ |
| Comparative Example 11 | Polyvinyl butyral | 3GO | 30 | Acetic acid | 0.1 | ○ | ○ | x | ○ |
| Comparative Example 12 | Polyvinyl butyral | 3GO | 30 | Acetic acid | 1 | ○ | ○ | x | ○ |
| Comparative Example 13 | Polyvinyl butyral | 3GO | 30 | Propionic acid | 0.01 | ○ | ○ | x | ○ |
| Comparative Example 14 | Polyvinyl butyral | 3GO | 30 | Propionic acid | 0.05 | ○ | ○ | x | ○ |
| Comparative Example 15 | Polyvinyl butyral | 3GO | 30 | Propionic acid | 0.1 | ○ | ○ | x | ○ |
| Comparative Example 16 | Polyvinyl butyral | 3GO | 30 | Propionic acid | 1 | ○ | ○ | x | ○ |
| Comparative Example 17 | Polyvinyl butyral | 3GO | 30 | Butyric acid | 0.01 | ○ | ○ | x | ○ |
| Comparative Example 18 | Polyvinyl butyral | 3GO | 30 | Butyric acid | 0.05 | ○ | ○ | x | ○ |
| Comparative Example 19 | Polyvinyl butyral | 3GO | 30 | Butyric acid | 0.1 | ○ | ○ | x | ○ |
| Comparative Example 20 | Polyvinyl butyral | 3GO | 30 | Butyric acid | 1 | ○ | ○ | x | ○ |
| Comparative Example 21 | Polyvinyl butyral | 3GO | 30 | Oxalic acid | 0.01 | ○ | ○ | x | ○ |
| Comparative Example 22 | Polyvinyl butyral | 3GO | 30 | Oxalic acid | 0.05 | ○ | ○ | x | ○ |
| Comparative Example 23 | Polyvinyl butyral | 3GO | 30 | Oxalic acid | 0.1 | ○ | ○ | x | ○ |
| Comparative Example 24 | Polyvinyl butyral | 3GO | 30 | Oxalic acid | 1 | ○ | ○ | x | ○ |
| Comparative Example 25 | Polyvinyl butyral | 3GO | 30 | 2-Ethylhexanoic acid | 0.05 | ○ | ○ | x | ○ |
| Comparative Example 26 | Polyvinyl butyral | 3GO | 30 | Adipic acid | 0.05 | ○ | ○ | x | ○ |
| Comparative Example 27 | Polyvinyl butyral | 3GO | 30 | Phthalic acid | 0.05 | ○ | ○ | x | ○ |
| Comparative Example 28 | Polyvinyl butyral | 3GO | 30 | 2-Ethylhexanoic acid | 0.05 | ○ | ○ | x | ○ |
| Comparative Example 29 | Polyvinyl butyral | 3GO | 30 | Adipio acid | 0.05 | ○ | ○ | x | ○ |
| Comparative Example 30 | Polyvinyl butyral | 3GO | 30 | Phthalic acid | 0.05 | ○ | ○ | x | ○ |

INDUSTRIAL APPLICABILITY

The present invention can provide an interlayer filling material for a touch panel which is used for filling an interlayer space between a touch panel and another component or an interlayer space between transparent conductive films included in the touch panel in production of a personal digital assistant, which is excellent in followability to steps of a decorative printing portion or wiring upon filling of an interlayer space (lamination) and also excellent in defoaming properties to release air bubbles entrapped during filling of an interlayer space (lamination) or air bubbles left near the steps, which is less likely to be whitened and less likely to deteriorate an ITO film even under a high-temperature and high-humidity environment. The present invention can also provide a laminate produced using the interlayer filling material for a touch panel.

REFERENCE SIGNS LIST

1: Interlayer filling material for a touch panel of the present invention
2: Touch panel
3: Surface protection panel
4: Polarizing film
5: Decorative printing portion
6: Conductive film
7: Silver layer (Silver electrode)
8: Glass sheet
9: Interlayer filling material for a touch panel (width of 30 mm, length of 100 mm)
10: Tester

The invention claimed is:

1. A method of producing a laminate comprising,
a touch panel; and
an interlayer filling material for the touch panel comprising a polyvinyl butyral, a plasticizer, and an organic acid,
the method comprising:
1) filling at least one interlayer space selected from the group consisting of an interlayer space between a surface protection panel and the touch panel, an interlayer space between the touch panel and a polarizing film, and an interlayer space between transparent conductive films included in the touch panel with the interlayer filling material to produce a stack,
2) performing preliminary heat-bonding of the stack at about 70° C.,
3) followed by an autoclave treatment of the stack at 70° C. to 85° C. and 0.5 MPa or more for 30 minutes,
4) then decompressing the stack after cooling to 30° C. or lower to produce the laminate,
wherein:
the plasticizer is at least one selected from the group consisting of triethylene glycol-di-2-ethylhexanoate, tetraethylene glycol-di-2-ethylhexanoate, triethylene glycol-di-pivalate, and di-(2-butoxyethyl)adipate,
the organic acid is at least one selected from the group consisting of 2-ethylhexanoic acid, adipic acid, and phthalic acid,
an amount of the plasticizer in the interlayer filling material for the touch panel is 5 to 45 parts by weight relative to 100 parts by weight of the polyvinyl butyral,
an amount of the organic acid in the interlayer filling material for the touch panel is 0.01 to 5 parts by weight relative to 100 parts by weight of the polyvinyl butyral, and the polyvinyl butyral contains 16 to 45 mol % hydroxy groups, a degree of acetylation of 0.1 to 30 mol %, and a degree of butyralization of 50 to 85 mol %.

2. The method of producing a laminate according to claim 1, wherein the total amount of the polyvinyl butyral and the plasticizer is 50% by weight or more of the interlayer filling material.

3. The method of producing a laminate according to claim 1, comprising filling the interlayer filling material in at least one interlayer space selected from the group consisting of the interlayer space between the surface protection panel and the touch panel, and the interlayer space between the touch panel and the polarizing film to produce the stack.

4. The method of producing a laminate according to claim 2, comprising filling the interlayer filling material in at least one interlayer space selected from the group consisting of the interlayer space between the surface protection panel and the touch panel, and the interlayer space between the touch panel and the polarizing film to produce the stack.

5. The method of producing a laminate according to claim 1, wherein the interlayer filling material for the touch panel is in a sheet form having a thickness of 5 μm to 800 μm.

6. The method of producing a laminate according to claim 2, wherein the interlayer filling material for the touch panel is in a sheet form having a thickness of 5 μm to 800 μm.

7. The method of producing a laminate according to claim 1, wherein 3) the autoclave treatment is performed at 70° C. and 0.5 MPa for 30 minutes.

8. The method of producing a laminate according to claim 2, wherein 3) the autoclave treatment is performed at 70° C. and 0.5 MPa for 30 minutes.

9. The method of producing a laminate according to claim 1, wherein the method consists of the steps 1) to 4).

10. The method of producing a laminate according to claim 2, wherein the method consists of the steps 1) to 4).

11. The method of producing a laminate according to claim 5, wherein the thickness of the interlayer filling material for the touch panel in the sheet form is 300 μm to 400 μm.

12. The method of producing a laminate according to claim 6, wherein the thickness of the interlayer filling material for the touch panel in the sheet form is 300 μm to 400 μm.

13. The method of producing a laminate according to claim 1, wherein the interlayer filling material contacts an ITO film.

14. The method of producing a laminate according to claim 2, wherein the interlayer filling material contacts an ITO film.

15. The method of producing a laminate according to claim 13, wherein 3) the autoclave treatment is performed at 70° C. and 0.5 MPa for 30 minutes.

16. The method of producing a laminate according to claim 14, wherein 3) the autoclave treatment is performed at 70° C. and 0.5 MPa for 30 minutes.

17. The method of producing a laminate according to claim 13, wherein the method consists of the steps 1) to 4).

18. The method of producing a laminate according to claim 14, wherein the method consists of the steps 1) to 4).

19. The method of producing a laminate according to claim 13, wherein the interlayer filling material for the touch panel is in a sheet form having a thickness of 300 μm to 400 μm.

20. The method of producing a laminate according to claim 14, wherein the interlayer filling material for the touch panel is in a sheet form having a thickness of 300 μm to 400 μm.

* * * * *